(12) United States Patent
Cho (10) Patent No.: US 7,119,742 B2
(45) Date of Patent: Oct. 10, 2006

(54) METHOD AND APPARATUS FOR ESTIMATING POSITION UTILIZING GPS SATELLITE SIGNAL

(75) Inventor: Dong-Sik Cho, Suwon-si (KR)

(73) Assignee: Samsung Electronics Co., Ltd., (KR)

(*) Notice: Subject to any disclaimer, the term of this patent is extended or adjusted under 35 U.S.C. 154(b) by 219 days.

(21) Appl. No.: 10/697,209

(22) Filed: Oct. 30, 2003

(65) Prior Publication Data

US 2004/0145519 A1    Jul. 29, 2004

(30) Foreign Application Priority Data

Jan. 23, 2003   (KR) .................. 10-2003-0004579

(51) Int. Cl.
   *G01S 5/14*   (2006.01)
(52) U.S. Cl. .................. 342/357.06; 342/357.15
(58) Field of Classification Search .......... 342/357.06, 342/357.15
   See application file for complete search history.

(56) References Cited

U.S. PATENT DOCUMENTS

| | | | | |
|---|---|---|---|---|
| 4,622,557 A | * | 11/1986 | Westerfield | 342/357.09 |
| 5,535,278 A | | 7/1996 | Cahn et al. | 380/49 |
| 5,629,707 A | | 5/1997 | Heuvel et al. | 342/357 |
| 5,774,829 A | * | 6/1998 | Cisneros et al. | 701/213 |
| 5,983,159 A | * | 11/1999 | Schipper | 701/213 |
| 6,011,509 A | * | 1/2000 | Dutka | 342/357.06 |
| 6,532,251 B1 | * | 3/2003 | King et al. | 342/357.01 |
| 2002/0032527 A1 | * | 3/2002 | Diggelen | 342/357.09 |
| 2002/0149514 A1 | | 10/2002 | Fichter et al. | 342/357.01 |
| 2004/0257277 A1 | * | 12/2004 | Abraham et al. | 342/357.09 |

FOREIGN PATENT DOCUMENTS

| | | | |
|---|---|---|---|
| JP | 08043516 A | * | 2/1996 |
| RU | 2070315 C | * | 12/1996 |
| WO | 02/46786 | | 6/2002 |
| WO | 02/071095 | | 9/2002 |

OTHER PUBLICATIONS

H.L. Dyckman et al., Robust GPS Geolocation by Method of Particle Filtering, Institute of Navigation National Technical Meeting, abstract, 2005.*

Determining Vehicle Position Using a Projected Satellite Position, http://www.yet2.com/app/insight/techofweek/9233?sid200, Jun. 2003.*

* cited by examiner

*Primary Examiner*—Thomas H. Tarcza
*Assistant Examiner*—Fred H. Mull
(74) *Attorney, Agent, or Firm*—Mills & Onello LLP (57) ABSTRACT

The invention is directed to an apparatus and method for determining or estimating position using GPS signals. The system includes a receiver such as a GPS receiver for receiving GPS signals and a processor for determining position from the received GPS signals. The receiver receives a first GPS signal from a first GPS satellite at a first position of the first GPS satellite. A second GPS signal is received by the receiver from the first GPS satellite at a second position of the first GPS satellite. Position of the receiver is determined using the first and second GPS signals. Time differences between the two signals can be determined and used in calculating position.

41 Claims, 8 Drawing Sheets

METHOD AND APPARATUS FOR ESTIMATING POSITION UTILIZING GPS SATELLITE SIGNAL

BACKGROUND OF THE INVENTION

This application claims the priority of Korean Patent Application No. 2003-0004579, filed on Jan. 23, 2003, in the Korean Intellectual Property Office, the contents of which are incorporated herein in their entirety by reference.

1. Field of the Invention

The present invention relates to a method and apparatus by which the position of a position estimation apparatus is estimated using a plurality of satellite signals that are output with predetermined time differences from one or more global positioning system (GPS) satellites.

2. Description of the Related Art

Generally, position estimation methods using the GPS satellite system estimate a range between the GPS satellite and the antenna of a position estimation apparatus (for example, a GPS receiver), using triangulation and clean and acquisition (C/A, or coarse and acquisition) code which is output from the GPS satellite.

The GPS satellite always transmits an L1 frequency of 1575.42 MHz that carries a C/A code. A position estimation apparatus generates the same code as the C/A code. The generated C/A code is compared with the received C/A code of the GPS satellite. From the result of the comparison, the time it takes for the C/A code output from the GPS satellite to arrive at the position estimation apparatus is measured.

The position estimation apparatus measures the range between the GPS satellite and the position estimation apparatus by using the result of multiplication of the speed of light (the speed of the C/A code output from the GPS satellite) and the time taken for arrival. Since the C/A code comprises a pseudo random noise code that is almost noise in itself, and the measured range between the GPS satellite and the position estimation apparatus contains errors, the range is referred to as a pseudo range.

A conventional position estimation apparatus receives satellite signals simultaneously output from at least four GPS satellites, measures the pseudo range corresponding to each satellite signal, and from the measured results estimates the position of the position estimation apparatus. That is, the position estimation apparatus estimates a 3-dimensional position of the position estimation apparatus by simultaneously using four or more satellite signals output from four or more GPS satellites.

However, due to the influence of the environment, the position estimation apparatus at times cannot receive at least four signals at the same time. In this case, the conventional position estimation apparatus cannot estimate its 3-dimensional position.

SUMMARY OF THE INVENTION

The invention is directed to a method and apparatus for determining position using a global position satellite (GPS) signal. A first GPS signal is received at a receiver from a first GPS satellite having a first position. A second GPS signal is received from the satellite at a second position of the satellite. The position of the receiver is determined using the first and second GPS signals.

A third GPS signal can be received from the first GPS satellite at a third position of the first GPS satellite, and the third GPS signal can be used in determining the position of the receiver. A fourth GPS signal can be received from the first GPS satellite at a fourth position of the first GPS satellite, and the fourth GPS signal can be used in determining position of the receiver. The fourth GPS signal can also be received from a second GPS satellite at a first position of the second GPS satellite, and this fourth GPS signal can be used in determining the position of the receiver.

The third GPS signal can also be received from a second GPS satellite at a first position of the second GPS satellite. This third GPS signal can be used in determining the position of the receiver. The fourth GPS signal can be received from the second GPS satellite at a second position of the second GPS satellite, and this fourth GPS signal can be used in determining position of the receiver. This fourth GPS signal can also be received from a third GPS satellite at a first position of the GPS satellite, and this fourth GPS signal can be used in determining position of the receiver.

The apparatus for determining position includes a receiver for receiving the GPS signals and a position calculation unit for determining position of the receiver. A controller detects a number of usable satellites that can be used in determining position. A stationary measurement request and selection unit can request that the user remain stationary during determination of position. The position calculation unit can include a time difference measurement determiner which requests that the user remain stationary during determination of position if a number of usable satellites is below a threshold. The position calculation unit also includes a time difference measurement calculator which calculates position by measuring time differences between the GPS signals.

In accordance with the invention, position of a receiver such as a GPS receiver can be determined using fewer than four GPS signals from GPS satellites. As a result, a much more reliable position determination or estimation system is provided, especially in cases where conditions such as environmental conditions prevent reception of GPS signals from four or more satellites.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIENTS

Figure 1:
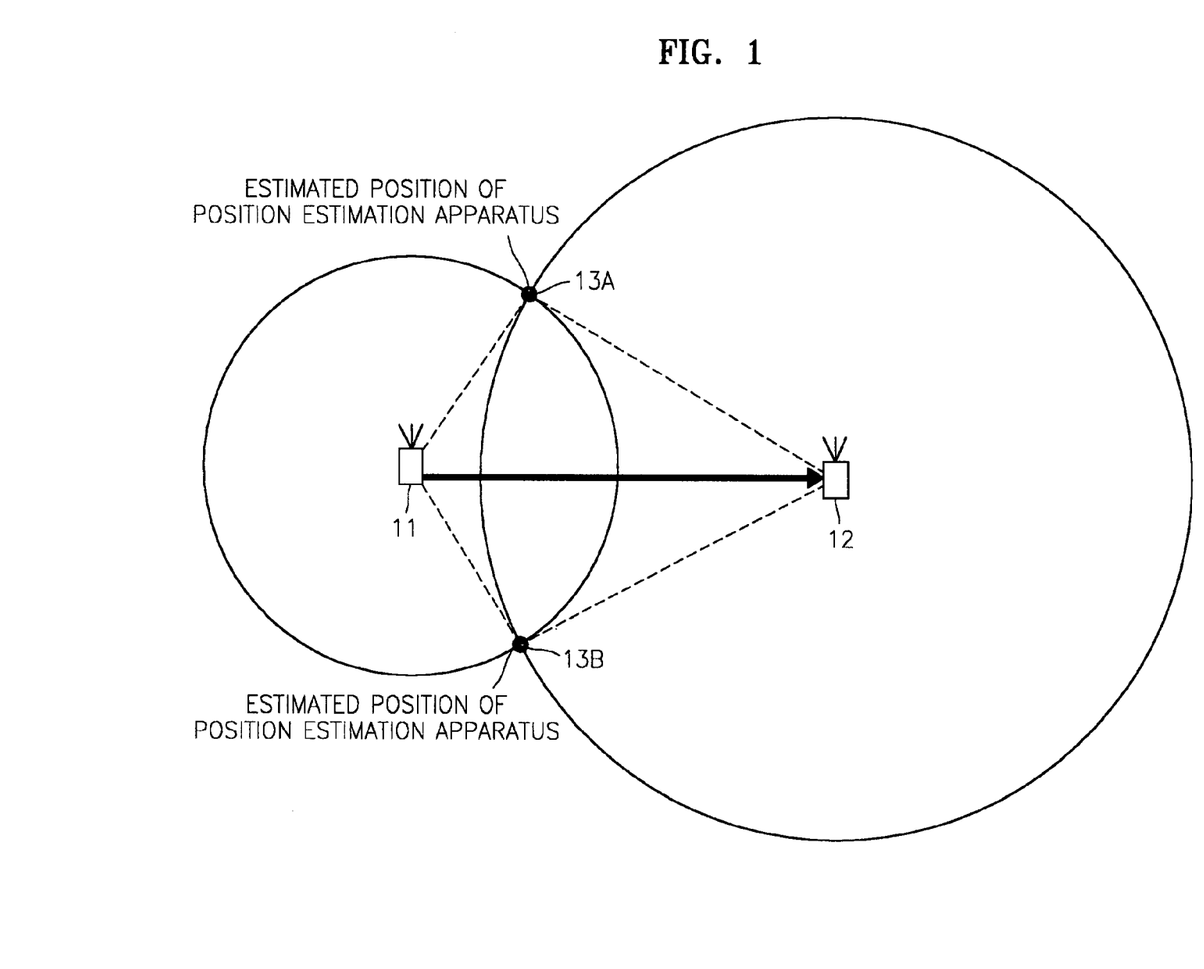
FIG. 1 is a diagram illustrating a position estimation method according to a first embodiment of the present invention.

Referring to FIG. 1, reference number 11 indicates the position of a GPS satellite at time (t1), and reference number 12 indicates the position of the GPS satellite at time (t2) after a lapse of a predetermined period from time (t1).

Accordingly, if each of the pseudo ranges of the satellite signals which are output at time (t1) and time (t2) from the identical GPS satellite is measured and then results of the two range equations are obtained, the estimated positions of the position estimation apparatus, for example a GPS receiver, may be two places (13A, 13B) if the positions are in a plane.

However, since the position of the position estimation apparatus is in space coordinates and is variable, and there is a time difference between the GPS satellite measurements for the position estimation apparatus, four range equations are required in order to actually obtain the position of the position estimation apparatus. But, the method for positioning the position estimation apparatus is not limited to the method using the pseudo range.

Figure 2:
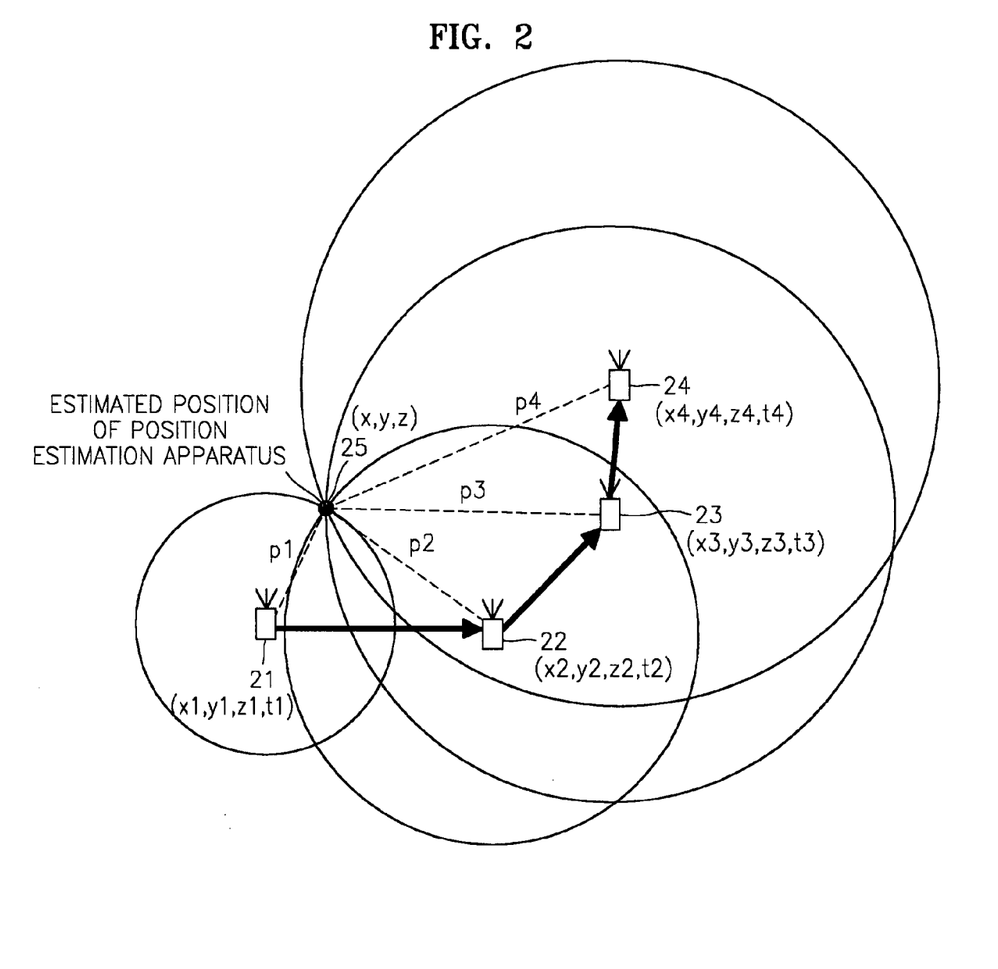
FIG. 2 is a diagram illustrating in more detail the position estimation method according to the first embodiment of the present invention.

FIG. 2 is a diagram illustrating in more detail the position estimation method according to the first preferred embodiment of the present invention. In the position estimation method according to the present invention, a plurality of satellite output signals with predetermined time differences from one or more GPS satellites are received, and in response to each of the received satellite signals, the position of the position estimation apparatus is estimated.

Referring to FIG. 2, coordinates (x, y, z) indicate an estimated position of a position estimation apparatus 25, coordinates (x1, y1, z1, t1) indicate position data (x1, y1, z1) of a GPS satellite 21 at time (t1), and p1 indicates the pseudo range measured at time (t1) by the position estimation apparatus. Here, it is preferable that the position estimation apparatus 25 be stationary or fixed.

Coordinates (x2, y2, z2, t2) indicate position data (x2, y2, z2) of a GPS satellite 22 at time (t2), and p2 indicates the pseudo range measured at time (t2) by the position estimation apparatus. Here, time (t2) indicates a lapse of a predetermined period from time (t1).

Coordinates (x3, y3, z3, t3) indicate position data (x3, y3, z3) of a GPS satellite 23 at time (t3), and p3 indicates the pseudo range measured at time (t3) by the position estimation apparatus. Here, time (t3) indicates a lapse of a predetermined period from time (t2).

Coordinates (x4, y4, z4, t4) indicate position data (x4, y4, z4) of a GPS satellite 24 at time (t4), and p4 indicates the pseudo range measured at time (t4) by the position estimation apparatus. Here, time (t4) indicates a lapse of a predetermined period from time (t3). Reference numbers 21–24 do not indicate four different satellites, but the same satellite at four different times and locations.

The identification number (ID) of each of the GPS satellites 21 through 24 may be identical or different numbers. For example, the IDs of at least two or more GPS satellites may be identical numbers.

The following equation 1 shows four range equations expressed by respective position data ((x1, y1, z1), (x2, y2, z2), (x3, y3, z3), (x4, y4, z4)) of the GPS satellites, and measured pseudo ranges (p1, p2, p3, p4) at points of time (t1, t2, t3, t4).

Accordingly, the position estimation apparatus receives position data ((x1, y1, z1), (x2, y2, z2), (x3, y3, z3), (x4, y4, z4)) that are output from respective GPS satellites 21 through 24 at respective points of time (t1, t2, t3, t4). Then, by measuring respective pseudo ranges (p1, p2, p3, p4) and obtaining solutions (or roots) for the four range equations given as equation 1, the position 25, for example, space coordinates (x, y, z), of the position estimation apparatus can be calculated or estimated.

$$\sqrt{(x1-x)^2 + (y1-y)^2 + (z1-z)^2} + c\Delta t = p1 \quad (1)$$

$$\sqrt{(x2-x)^2 + (y2-y)^2 + (z2-z)^2} + c\Delta t = p2$$

$$\sqrt{(x3-x)^2 + (y3-y)^2 + (z3-z)^2} + c\Delta t = p3$$

$$\sqrt{(x4-x)^2 + (y4-y)^2 + (z4-z)^2} + c\Delta t = p4$$

Here, c denotes the speed of light and $\Delta t$ denotes the difference between the time of a GPS satellite and the time of the position estimation apparatus.

In order to obtain space coordinates (x, y, z) 25 of the position estimation apparatus, at least four range equations as shown in equation 1 are needed. Accordingly, the number of GPS satellites whose satellite signals can be simultaneously received determines the minimum number of measuring times of pseudo ranges.

For example, if the position estimation apparatus can receive satellite signals output from two GPS satellites, the position estimation apparatus receives the satellite signals output from the two GPS satellites at a point of time and measures respective pseudo ranges. Then, at another point of time, the position estimation apparatus receives the satellite signals output from the two GPS satellites (or two satellite signals output from two GPS satellites) and measures respective pseudo ranges. By doing so, four range equations as shown in equation 1 can be obtained.

In this case, in order to obtain the position 25 of the position estimation apparatus, that is, the space coordinates (x, y, z), the pseudo range is measured at least twice at each of the different points of time.

Also, if the position estimation apparatus can receive satellite signals output from three GPS satellites, the position estimation apparatus receives the satellite signals output from the three GPS satellites at a point of time and measures respective pseudo ranges. Then, at another point of time, the position estimation apparatus receives the satellite signal output from any one of the three GPS satellites and measures the pseudo range. By doing so, four range equations as shown in equation 1 can be obtained.

Accordingly, in order to obtain the position 25 of the position estimation apparatus, that is, the space coordinates (x, y, z), the pseudo range is measured at least twice at each of the different points of time.

If the altitude (that is, the coordinate of the z-axis) of the position estimation apparatus is already known, the minimum number of measuring times of pseudo ranges for estimating the space coordinates of the position estimation apparatus is less by at least once than that for estimating the space coordinates when the altitude is not known.

Figure 3:
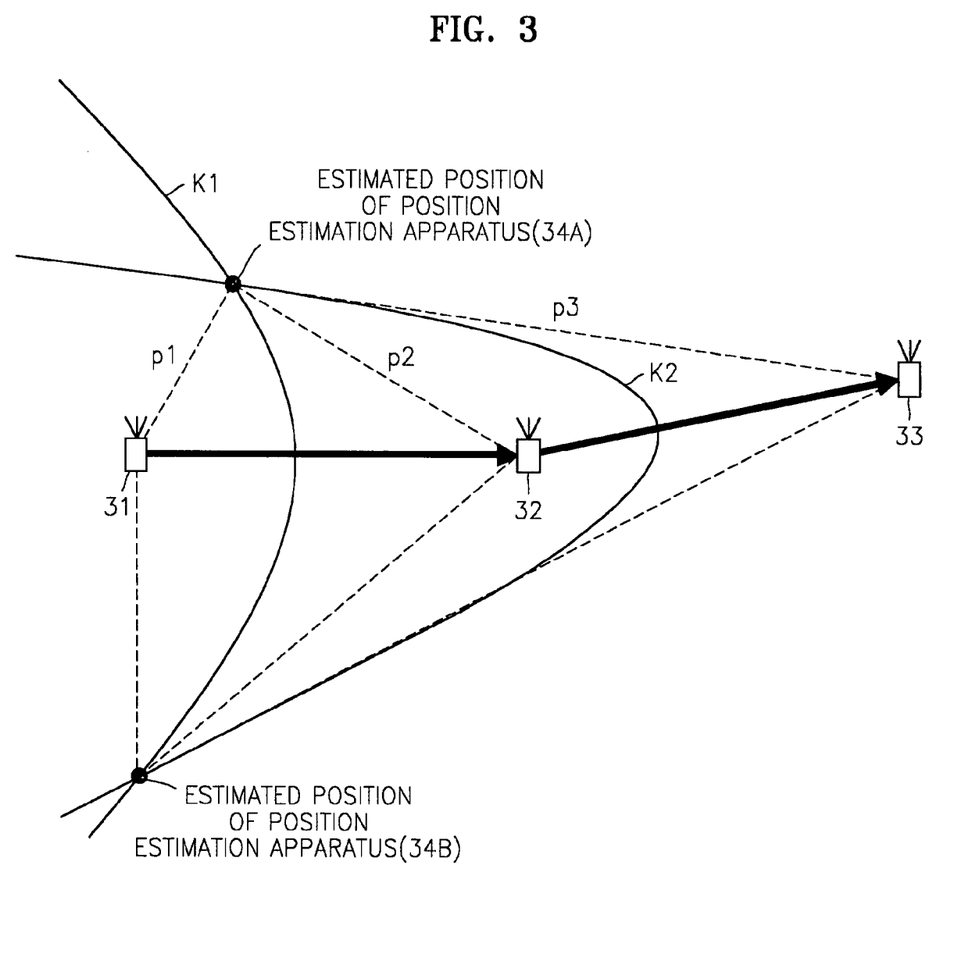
FIG. 3 is a diagram illustrating a position estimation method according to a second embodiment of the present invention.

FIG. 3 is a conceptual diagram illustrating a position estimation method according to a second preferred embodiment of the present invention. The position estimation apparatus estimates the position of the position estimation apparatus, by using the differences of every two pseudo ranges that are close in time.

In this method, a pseudo range is measured from each of a plurality of satellite signals that are output at relatively shorter time differences from a single GPS satellite (for example, the ID of the GPS satellite, each point of time, position data at respective points of time). Then, by using the measured pseudo ranges, the position of the position estimation apparatus is estimated. Accordingly, delays common to the satellite signals, for example, ionospheric and tropospheric delay, cancel each other such that the position of the position estimation apparatus can be more precisely estimated.

When the position of the position estimation apparatus is estimated by using the differences of every two pseudo ranges that are close in time, the estimated positions of the position estimation apparatus correspond to coordinates on hyperbolas. Accordingly, intersections where two or more hyperbolas intersect are the estimated positions of the position estimation apparatus.

Referring to FIG. 3, reference numbers 31, 32, and 33 indicate positions of a single GPS satellite, which has an identical ID at different points of time, and p1, p2, and p3 indicate pseudo ranges measured by the position estimation apparatus at positions 31, 32, and 33, respectively.

In a plane, hyperbola (k1), in which the value of (p1–p2) is constant, and hyperbola (k2), in which the value of (p2–p3) is constant, meet on two points (34A, 34B) such that the two points (34A, 34B) correspond to an estimated position of the position estimation apparatus.

However, since the position of the position estimation apparatus is a 3-dimensional space position, the pseudo ranges must be measured at least four times at different points of time in order to estimate the position of the position estimation apparatus. If the altitude (that is, the coordinate of the z-axis) of the position estimation apparatus is known, the position estimation apparatus can estimate the spatial position of the position estimation apparatus by measuring pseudo ranges at least three times at different points of time.

Figure 4:
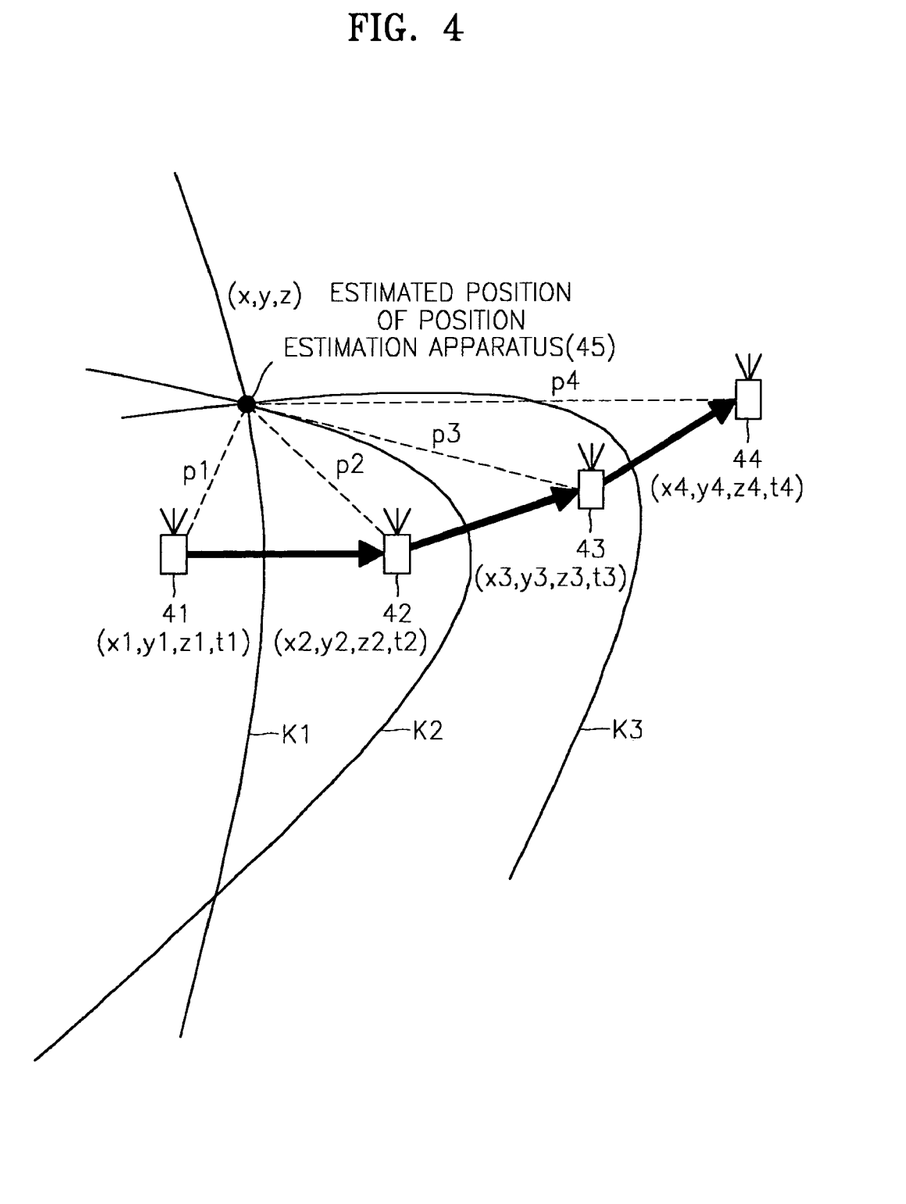
FIG. 4 is a diagram illustrating in more detail the position estimation method according to the first embodiment of the present invention.

FIG. 4 is a diagram illustrating in more detail the position estimation method according to the first preferred embodiment of the present invention. Coordinates (x, y, z) indicate an estimated position of a position estimation apparatus 45, coordinates (x1, y1, z1, t1) indicate position data (x1, y1, z1) of a GPS satellite 41 at time (t1), and p1 indicates the pseudo range measured at time (t1) by the position estimation apparatus. Coordinates (x2, y2, z2, t2) indicate position data (x2, y2, z2) of a GPS satellite 42 at time (t2), and p2 indicates the pseudo range measured at time (t2) by the position estimation apparatus. Here, time (t2) indicates a lapse of a predetermined period from time (t1). Coordinates (x3, y3, z3, t3) indicate position data (x3, y3, z3) of a GPS satellite 43 at time (t3), and p3 indicates the pseudo range measured at time (t3) by the position estimation apparatus. Here, time (t3) indicates a lapse of a predetermined period from time (t2). Coordinates (x4, y4, z4, t4) indicate position data (x4, y4, z4) of a GPS satellite 44 at time (t4), and p4 indicates the pseudo range measured at time (t4) by the position estimation apparatus. Here, time (t4) indicates a lapse of a predetermined period from time (t3). Here, the GPS satellites 41 through 44 are the same GPS satellite, and it is preferable that the position estimation apparatus 45 be stationary or fixed.

The following equation 2 shows four pseudo range equations expressed by respective position data ((x1, y1, z1), (x2, y2, z2), (x3, y3, z3), (x4, y4, z4)) of the GPS satellite at points of time (t1, t2, t3, t4), and measured pseudo ranges (p1, p2, p3, p4). Here, k1 denotes a hyperbola in which the value of (p1–p2) is constant, k2 denotes a hyperbola in which the value of (p2–p3) is constant, and k3 denotes a hyperbola in which the value of (p3–p4) is constant.

Accordingly, the position estimation apparatus receives position data ((x1, y1, z1), (x2, y2, z2), (x3, y3, z3), (x4, y4, z4)) that are output from the same GPS satellite at respective points of time (t1, t2, t3, t4). Then, by measuring respective pseudo ranges (p1, p2, p3, p4) and obtaining solutions (or roots) for the range equations given as equation 2, position 45, for example, space coordinates (x, y, z), of the position estimation apparatus can be calculated or estimated.

$$\sqrt{(x1-x)^2 + (y1-y)^2 + (z1-z)^2} - \sqrt{(x2-x)^2 + (y2-y)^2 + (z2-z)^2} = k1$$
$$\sqrt{(x2-x)^2 + (y2-y)^2 + (z2-z)^2} - \sqrt{(x3-x)^2 + (y3-y)^2 + (z3-z)^2} = k2$$
$$\sqrt{(x3-x)^2 + (y3-y)^2 + (z3-z)^2} - \sqrt{(x4-x)^2 + (y4-y)^2 + (z4-z)^2} = k3$$
(2)

Figure 5:
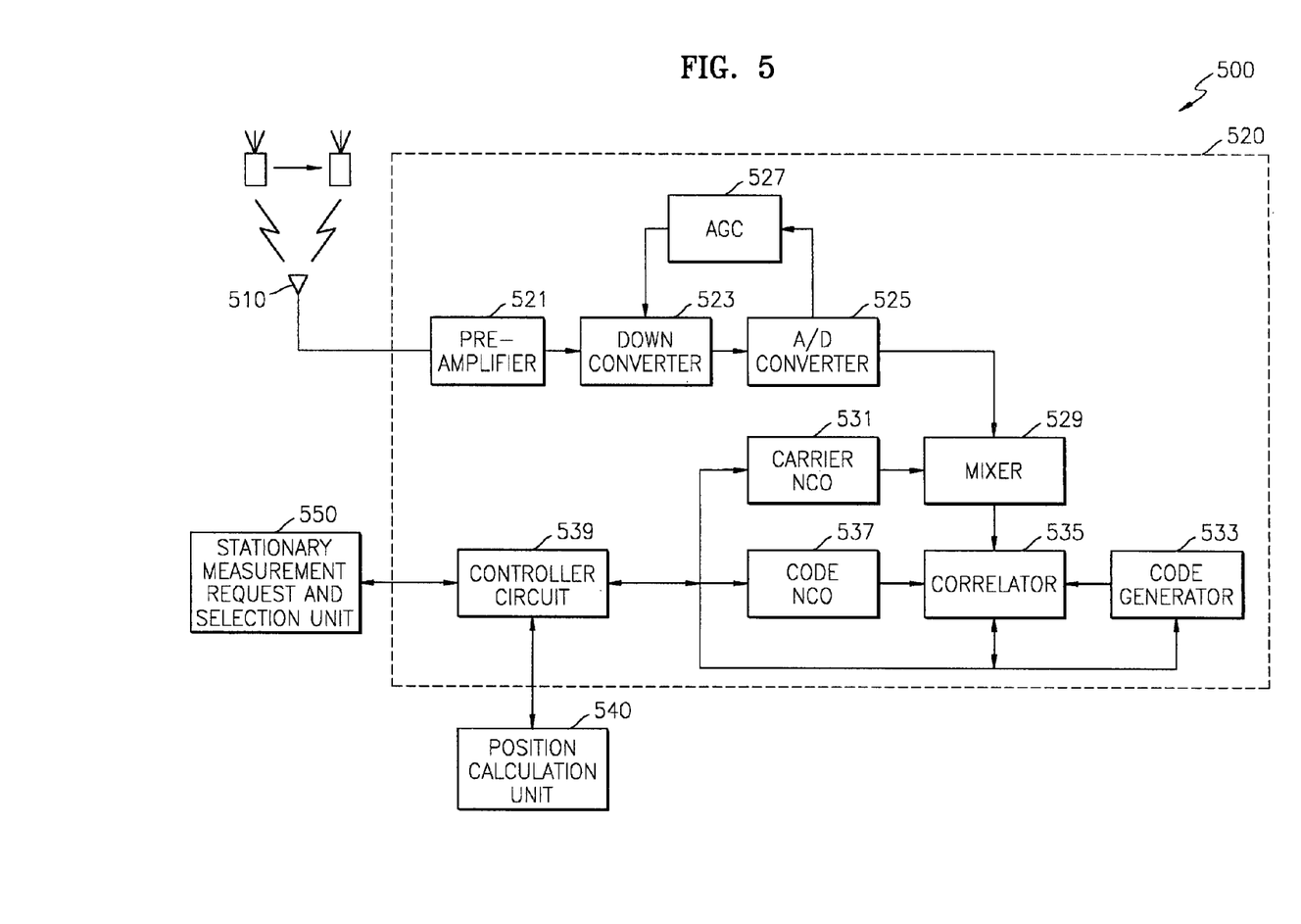
FIG. 5 is a schematic block diagram of a position estimation apparatus according to an embodiment of the present invention.

FIG. 5 is a schematic block diagram of a position estimation apparatus according to a preferred embodiment of the present invention. Referring to FIG. 5, the position estimation apparatus (for example, a GPS receiver 500) comprises an antenna 510, a signal processing unit 520, a position calculation unit 540, and a stationary measurement request and selection unit 550.

The antenna 510 receives a satellite signal from a satellite. The signal processing unit 520 calculates correlation values between C/A codes loaded on the satellite signal received through the antenna 510 and self-generated C/A codes and then outputs delay information based on the calculation result to the position calculation unit 540.

The signal processing unit 520 includes a pre-amplifier 521, a down converter 523, an analog-to-digital (A/D) converter 525, an automatic gain controller (AGC) 527, a mixer 529, a carrier numerically controlled oscillator (NCO) 531, a code generator 533, a correlator 535, a code NCO 537 and a controller 539.

The pre-amplifier 521 amplifies the satellite signal received from the satellite through the antenna 510 and outputs the amplified satellite signal to the down converter 523.

The down converter 523 receives the amplified satellite signal, converts the same into an intermediate frequency signal in response to the output signal of the AGC 527, and outputs the converted signal to the A/D converter 525.

The A/D converter 525 receives the intermediate frequency signal and converts the same into a digital signal.

The AGC 527 controls the gain of the down converter 523 in response to the output signal of the A/D converter 525.

The carrier NCO 531 generates I (in phase) sine waves and a Q (quadrature phase) sine waves in order to compensate for a doppler effect of the satellite signal.

The mixer 529 mixes the output signal of the A/D converter 525 with the I and Q sine waves output from the carrier NCO 531 to offset the doppler effect of the satellite signal. Thus, the mixer 529 provides C/A codes output from a GPS satellite to the correlator 535.

The code NCO 537 generates delayed codes in accordance with an expected delay of the satellite signal from the C/A codes generated from the code generator 533, and outputs the generated codes to the correlator 535. The code generator 533 generates C/A codes based on a reference time of the position estimation apparatus 500 and an identification (ID) number of a satellite to be detected.

The correlator 535 calculates a correlation value between the C/A code loaded on the output signal of the mixer 529 and the C/A code output from the code NCO 537, and outputs the delay information based on the calculation result to the controller 539.

The controller 539 detects the satellite signal in response to the output signal of the correlator 535. If no satellite signal is detected, the controller 539 controls the next expected doppler frequency, delayed code value or a code value of another satellite to be output to the mixer 529 or the correlator 535 through the carrier NCO 531 and the code NCO 537. Thus, the operation of the correlator 535 is iteratively performed.

However, if a desired satellite signal is detected, the controller 539 controls the calculation result of the correlator 535 to be output to the position calculation unit 540.

The position calculation unit 540, in response to the delay signal output from the signal processing unit 520, obtains pseudo ranges and/or solutions of distance equations expressed by equations 1 and 2. In this case, when the number of simultaneously measurable satellites is generally smaller than that of satellites required for estimating the position of the position estimation apparatus 500, the position calculation unit 540 requests a user of the position estimation apparatus 500 to stop or remain stationary by voice or text through the stationary measurement request and selection unit 550 using the position estimation method according to the present invention.

After the user stops, the stationary measurement request and selection unit 550 selects a stationary measuring function to then output a predetermined selection signal to the position calculation unit 540. Thus, the position calculation unit 540 starts estimation of the stationary position of the position estimation apparatus 500 using the position estimation method according to the present invention.

Figure 6:
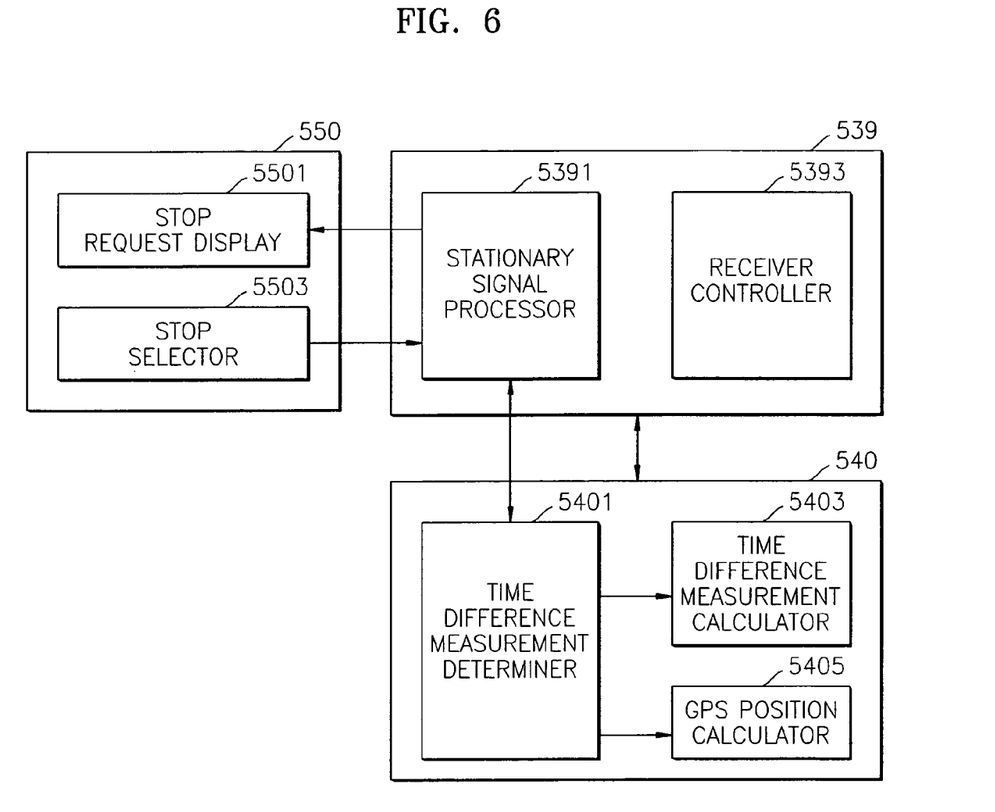
FIG. 6 is a detailed schematic block diagram of the controller and the position calculation unit shown in FIG. 5.

FIG. 6 is a detailed diagram of the controller 539, the stationary measurement request and selection unit 550 and the position calculation unit 540 shown in FIG. 5. Referring to FIGS. 5 and 6, the stationary measurement request and selection unit 550 includes a stop request display 5501 and a stop selector 5503. The controller 539 includes a stationary signal processor 5391 and a receiver controller 5393. The position calculation unit 540 includes a time difference measurement determiner 5401, a time difference measurement calculator 5403 and a GPS position calculator 5405.

The time difference measurement determiner 5401 determines whether time difference measurement is initiated or not, in response to the delay information output from the controller 539. The time difference measurement calculator 5403 calculates the position of the position estimation apparatus 500 by measuring the time difference. The GPS position calculator 5405 calculates the position of the position estimation apparatus 500 by an ordinary method. That is, the GPS position calculator 5405 is an exemplary circuit for estimating the position of the position estimation apparatus 500 from a simultaneously received plurality of satellite signals.

If the receiver controller 5393 outputs delay information corresponding to data of detected satellites, that is, satellite signals output from measurable satellites, to the time difference measurement determiner 5401 of the position calculation unit 540, the time difference measurement determiner 5401 determines whether there enough satellite signals to calculate the position of the position estimation apparatus 500, based on the received delay information.

If the number of received satellite signals is sufficient, the time difference measurement determiner 5401 instructs the general GPS position calculator 5405 to calculate the position of the position estimation apparatus 500. If the number of received satellite signals is not sufficient, the time difference measurement determiner 5401 sends a request signal for stationary measurement to the stationary signal processor 5391.

The stationary signal processor 5391 which has received the signal output from the time difference measurement determiner 5401 notifies the user to stop through the stop request display 5501. Then, if the notified user permits stationary measurement through the stop selector 5503, the stop selector 5503 outputs a permission signal to the time difference measurement determiner 5401 through the stationary signal processor 5391.

The time difference measurement determiner 5401 having received the permission signal instructs the time difference measurement calculator 5403 to start time difference measurement according to the present invention on the assumption that the user has stopped.

When the stationary measurement is not permitted even if the user has been requested to stop through the stop request display 5501, the time difference measurement determiner 5401 cannot calculate the position of the position estimation apparatus 500 and continuously detects satellites necessary for calculating the position of the position estimation apparatus 500.

Since the user remains stationary in the course of estimating the position of the position estimation apparatus 500 using a time difference, the user is continuously notified to remain stationary. For example, in order to start time difference measurement, the stop request display 5501 flickers a light. The light is on while measuring a time difference. Thus, the user can distinguish a stop request for starting time difference measurement and a stop request for maintaining the stationary state.

Also, if time difference measurement is not necessary due to reception of enough satellite signals while measuring a time difference, the stop request display 5501 turns the light off, thereby notifying the user that he/she need not remain stationary.

Figure 7:
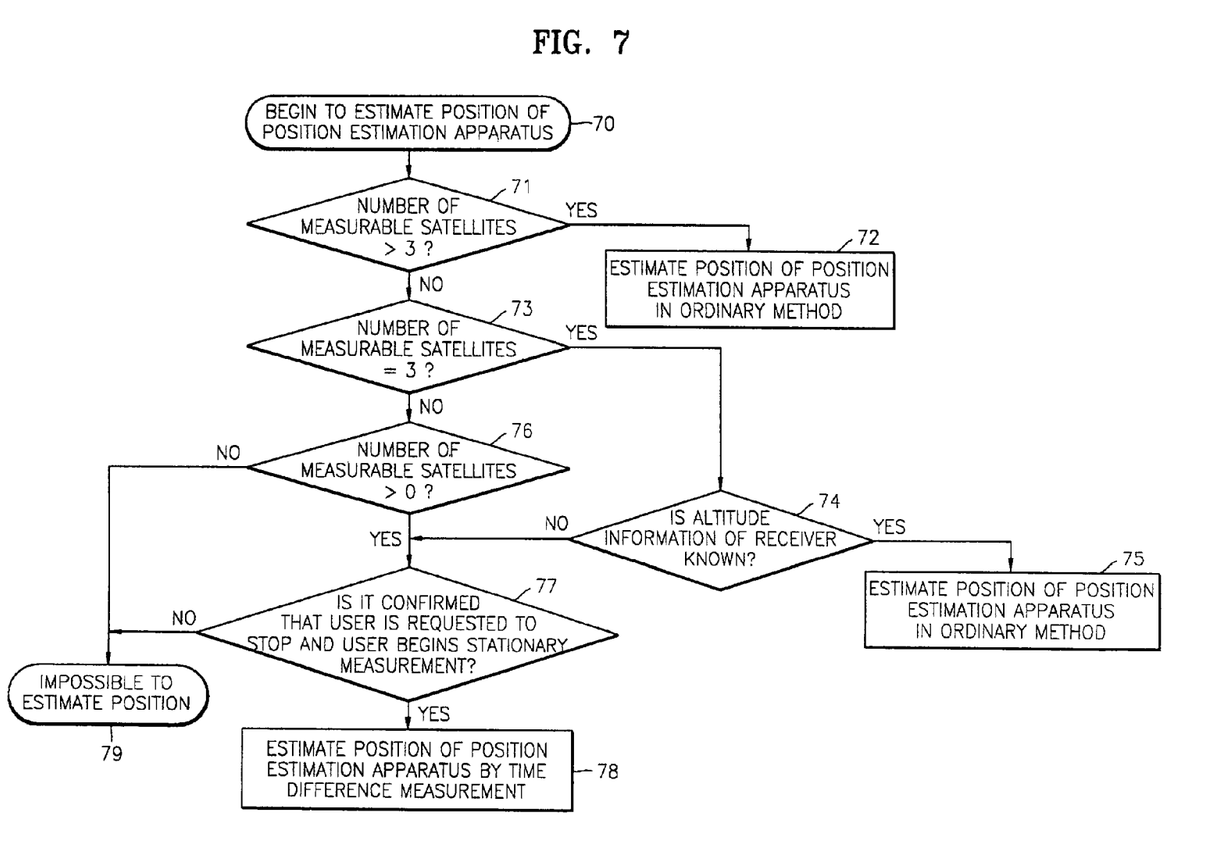
FIG. 7 is a flowchart illustrating steps performed by a position estimation method based on the number of satellites that can be measured according to the present invention.

FIG. 7 s a flowchart of steps performed in a position estimation method based on the number of satellites that can be measured, of the first and second preferred embodiments of the present invention. Referring to FIGS. 5 through 7, the position calculation unit 540, in response to a plurality of satellite signals that are output with predetermined time differences from at least one or more GPS satellites, can estimate the position of the position estimation apparatus 500.

The position calculation unit 540 receives a plurality of satellite signals that are output with predetermined time differences from one or more GPS satellites and then can estimate the position of the position estimation apparatus 500.

If the position estimation apparatus 500 begins position estimation in step 70, then the time difference measurement determiner 5401 of the position calculation unit 540 determines whether or not the number of satellites whose pseudo range can be measured (hereinafter referred to as "the number of measurable satellites") is greater than 3 in step 71. That is, if satellite signals from four or more satellites can all be received, or if the number of measurable satellites is greater than 3, the general GPS position calculation unit 5405 of the position calculation unit 540 estimates its position in the ordinary method in step 72.

When the number of measurable satellites is 3 in step 73, if the altitude information (the coordinate z) of the position estimation apparatus 500 is already known in step 74, the general GPS position calculation unit 5405 of the position calculation unit 540 estimates its position in the ordinary method in step 75.

However, when the number of measurable satellites is 1 or 2 in step 76, or when the number of measurable satellites is 3 and the altitude information of the position estimation apparatus 500 is not known in steps 73 and 74, the stop request display 5501 asks the user of the position estimation apparatus 500 to stop and estimates the position of the position estimation apparatus 500 according the position estimation method of the present invention. If the user, in response to this, stops and begins to execute the position estimation method according to the present invention in step 77, the position estimation apparatus 500 measures a pseudo range in response to each of a plurality of satellite signals that are input with predetermined time differences (hereinafter referred to as "time difference measurement"), and estimates the position of the position estimation apparatus 500 based on the satellite signals and the respective pseudo ranges in step 78. In this case, equation 2 is used.

However, if there is no measurable satellites at all in step 76, or if the user does not respond to the stop request and does not execute the position estimation method in step 77, it is not possible to estimate the position of the position estimation apparatus 500 in step 79.

Figure 8:
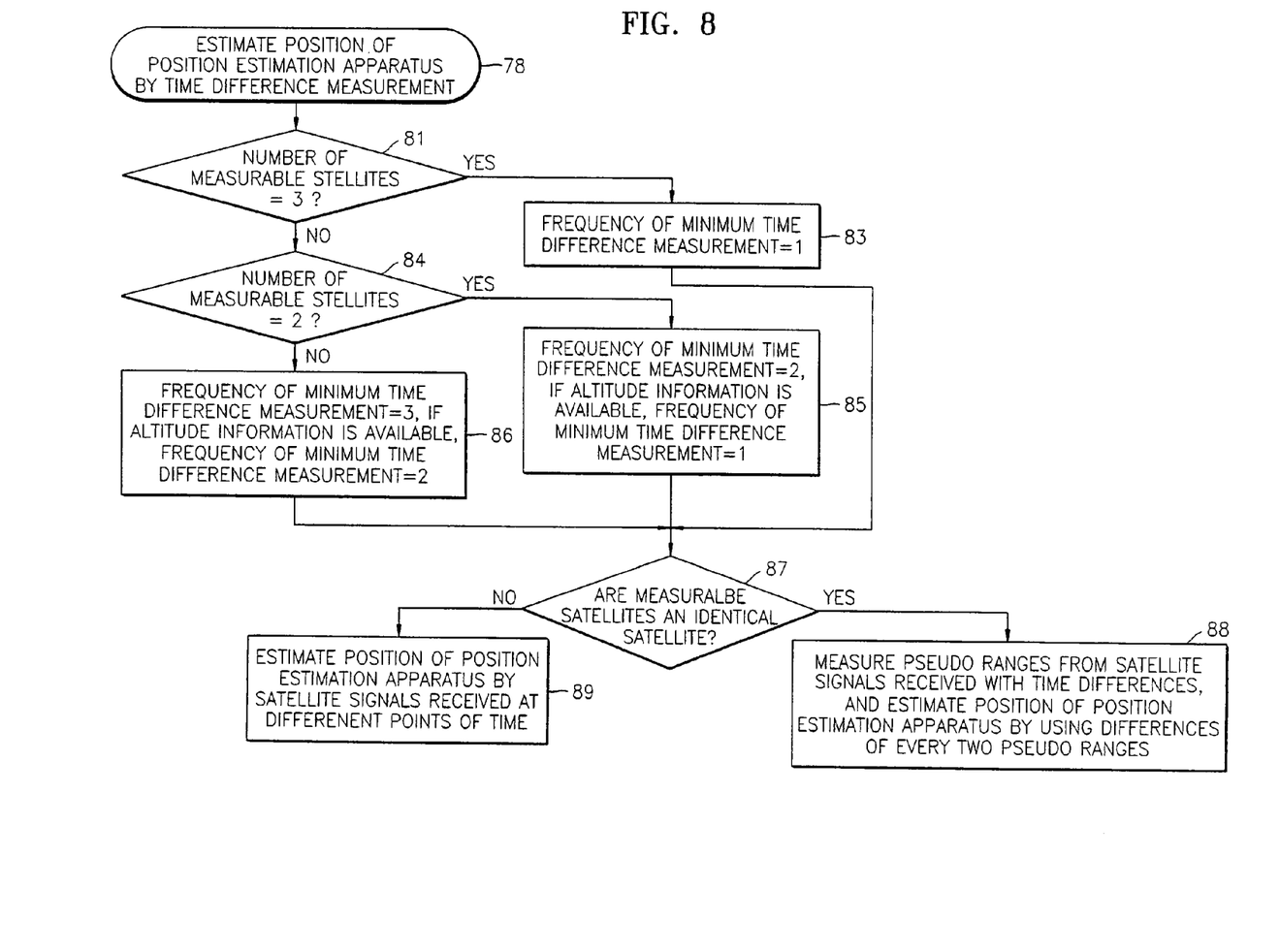
FIG. 8 is a flowchart illustrating in more detail the position estimation method of a position estimation apparatus as shown in FIG. 5 by measuring time differences, in accordance with the present invention.

FIG. 8 is a flowchart showing in more detail the position estimation method according to the first and second embodiments of the present invention. That is, FIG. 8 is a flowchart illustrating step 78 of FIG. 7 in more detail.

If the position estimation of the position estimation apparatus 500 by the time difference measurement begins in step 78, the time difference measurement determiner 5401 of the position calculation unit 540 determines whether or not the number of measurable satellites is 3 in step 81. If the determination result indicates that the number of measurable satellites is 3 in step 81, the position estimation apparatus 500 measures a pseudo range in response to each of satellite signals that are output from the three measurable satellites at a first point of time, and measures a pseudo range in response to a satellite signal that is output from any one of the three measurable satellites at a second point of time after a lapse of predetermined time from the first point of time, or a satellite signal output from a new satellite other than the three satellites, in step 83. Accordingly, the minimum number of measuring time differences after the first point of time is one.

If the number of measurable satellites is 2 in step 84, the time difference calculator 5403 measures a pseudo range in response to each of satellite signals that are output form the two measurable satellites at a first point of time, and measures a pseudo range in response to each of satellites signals that are output from the two measurable satellites at a second point of time after a lapse of predetermined time from the first point of time, or a satellite signal output from a new satellite other than the two satellites, in step 85.

Accordingly, the minimum number of measuring time differences after the first point of time is two.

If the number of measurable satellites is 2 in step 84, and the altitude information of the position estimation apparatus 500 is already known, the position estimation apparatus 500 measures a pseudo range in response to each of the satellite signals output from the two measurable satellites at the second point of time in step 85. Accordingly, the minimum number of measuring time differences after the first point of time is one.

If the number of measurable satellites is not 2, that is, if the number of measurable satellites is 1 in step 84, the position estimation apparatus 500 measures a pseudo range in response to the satellite signal output from the measurable satellite at a first point of time, measures a pseudo range in response to the satellite signal output from the measurable satellite at a second point of time after a lapse of predetermined time from the first point of time, or a satellite signal output from a new satellite other than the satellite, measures a pseudo range in response to the satellite signal output from the measurable satellite at a third point of time after a lapse of predetermined time from the second point of time, or a satellite signal output from a new measurable satellite, and measures a pseudo range in response to the satellite signal output from the measurable satellite at a fourth point of time after a lapse of predetermined time from the third point of time, or a satellite signal output from a new measurable satellite. Accordingly, the minimum number of measuring time differences after the first point of time is 3 times in step 86.

However, if the altitude information of the position estimation apparatus 500 is already known, the position estimation apparatus 500 measures a pseudo range in response to the satellite signal output from the measurable satellite at the second point of time, or a satellite signal output from a new measurable satellite, and measures a pseudo range in response to the satellite signal output from the measurable satellite at the third point of time, or a satellite signal output from a new measurable satellite. Accordingly, the minimum number of measuring time differences after the first point of time is two in step 86.

When the time difference measurement is performed, the position estimation apparatus 500 determines at each point of time whether or not a measurable satellites is the same satellite in step 87. If the determination result indicates that the satellites is the same satellite, the position estimation apparatus 500 measures the pseudo range between the position estimation apparatus 500 and the satellite with the time difference, and estimates the position of the position estimation apparatus 500 by using the differences of every two pseudo ranges expressed by equation 2 in step 88.

If the determination result indicates that the satellites are not an identical satellite, the position estimation apparatus 500 estimates its position by measuring the pseudo range between the position estimation apparatus 500 and the satellite with the time difference in step 89.

As described above, by the position estimation method and apparatus according to the present invention, even when the number of measurable satellites is 3 or less, the pseudo ranges can be measured by using time differences, and by using the measured pseudo ranges, the position of the position estimation apparatus can be precisely estimated or calculated.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A method of determining position using a global position satellite (GPS) signal, comprising:
   receiving at a receiver a first GPS signal from a first GPS satellite at a first position of the first GPS satellite;
   receiving at the receiver a second GPS signal from the first GPS satellite at a second position of the first GPS satellite; and
   determining a position of the receiver using the first and second GPS signals,
   determining the position of the receiver comprising measuring pseudo ranges from the first and second GPS signals, and estimating the position of the receiver using differences of a plurality of pairs of immediately consecutive psuedo ranges.

2. The method of claim 1, further comprising receiving at the receiver a third GPS signal from the first GPS satellite at a third position of the first GPS satellite.

3. The method of claim 2, further comprising using the third GPS signal to determine the position of the receiver.

4. The method of claim 2, further comprising receiving at the receiver a fourth GPS signal from the first GPS satellite at a fourth position of the first GPS satellite.

5. The method of claim 4, further comprising using the fourth GPS signal to determine the position of the receiver.

6. The method of claim 4, further comprising using the third and fourth GPS signals to determine the position of the receiver.

7. The method of claim 2, further comprising receiving at the receiver a fourth GPS signal from a second GPS satellite at a first position of the second GPS satellite.

8. The method of claim 7, further comprising using the fourth GPS signal to determine the position of the receiver.

9. The method of claim 7, further comprising using the third and fourth GPS signals to determine the position of the receiver.

10. The method of claim 1, further comprising receiving at the receiver a third GPS signal from a second GPS satellite at a first position of the second GPS satellite.

11. The method of claim 10, further comprising using the third GPS signal to determine the position of the receiver.

12. The method of claim 10, further comprising receiving at the receiver a fourth GPS signal from the second GPS satellite at a second position of the second GPS satellite.

13. The method of claim 12, further comprising using the fourth GPS signal to determine the position of the receiver.

14. The method of claim 12, further comprising using the third and fourth GPS signals to determine the position of the receiver.

15. The method of claim 10, further comprising receiving at the receiver a fourth GPS signal from a third GPS satellite at a first position of the third GPS satellite.

16. The method of claim 15, further comprising using the fourth GPS signal to determine the position of the receiver.

17. The method of claim 15, further comprising using the third and fourth GPS signals to determine the position of the receiver.

18. The method of claim 1, wherein the position of the receiver is determined using a time difference related to an elapsed time between the first and second GPS signals.

19. The method of claim 1, wherein position of the receiver is determined according to the following equations:

$$\sqrt{(x1-x)^2 + (y1-y)^2 + (z1-z)^2} + c\Delta t = p1 \quad (1)$$
$$\sqrt{(x2-x)^2 + (y2-y)^2 + (z2-z)^2} + c\Delta t = p2$$
$$\sqrt{(x3-x)^2 + (y3-y)^2 + (z3-z)^2} + c\Delta t = p3$$
$$\sqrt{(x4-x)^2 + (y4-y)^2 + (z4-z)^2} + c\Delta t = p4$$

wherein p1, p2, p3, p4 are the pseudo ranges, c is the speed of light, $\Delta t$ is a difference between time at a satellite and time at the receiver, (x1, y1, z1), (x2, y2, z2), (x3, y3, z3) and (x4, y4, z4) represent position data received at four different times t1, t2, t3, t4; and $$\sqrt{(x1-x)^2 + (y1-y)^2 + (z1-z)^2} - \sqrt{(x2-x)^2 + (y2-y)^2 + (z2-z)^2} = k1 \quad (2)$$
$$\sqrt{(x2-x)^2 + (y2-y)^2 + (z2-z)^2} - \sqrt{(x3-x)^2 + (y3-y)^2 + (z3-z)^2} = k2$$
$$\sqrt{(x3-x)^2 + (y3-y)^2 + (z3-z)^2} - \sqrt{(x4-x)^2 + (y4-y)^2 + (z4-z)^2} = k3$$

wherein (x,y,z) are position coordinates of the receiver and
   p1−p2=k1, a constant;
   p2−p3=k2, a constant; and
   p3−p4=k3, a constant.

20. An apparatus for determining position using a global position satellite (GPS) signal, comprising:
   a receiver for receiving a first GPS signal from a first GPS satellite at a first position of the first GPS satellite and receiving a second GPS signal from the first GPS satellite at a second position of the first GPS satellite; and
   a processor for determining a position of the receiver using the first and second GPS signals, wherein when the processor determines the position of the receiver using the first and second GPS signals from the first GPS satellite, the processor measures pseudo ranges from the first and second GPS signals and estimates the position of the receiver using differences of a plurality of pairs of immediately consecutive psuedo ranges.

21. The apparatus of claim 20, wherein the receiver receives a third GPS signal from the first GPS satellite at a third position of the first GPS satellite.

22. The apparatus of claim 21, wherein the processor uses the third GPS signal to determine the position of the receiver.

23. The apparatus of claim 21, wherein the receiver receives a fourth GPS signal from the first GPS satellite at a fourth position of the first GPS satellite.

24. The apparatus of claim 23, wherein the processor uses the fourth GPS signal to determine the position of the receiver.

25. The apparatus of claim 23, wherein the processor uses the third and fourth GPS signals to determine the position of the receiver.

26. The apparatus of claim 21, wherein the receiver receives a fourth GPS signal from a second GPS satellite at a first position of the second GPS satellite.

27. The apparatus of claim 26, wherein the processor uses the fourth GPS signal to determine the position of the receiver.

28. The apparatus of claim 26, wherein the processor uses the third and fourth GPS signals to determine the position of the receiver.

29. The apparatus of claim 20, wherein the receiver receives a third GPS signal from a second GPS satellite at a first position of the second GPS satellite.

30. The apparatus of claim 29, wherein the processor uses the third GPS signal to determine the position of the receiver.

31. The apparatus of claim 29, wherein the receiver receives a fourth GPS signal from the second GPS satellite at a second position of the second GPS satellite.

32. The apparatus of claim 31, wherein the processor uses the fourth GPS signal to determine the position of the receiver.

33. The apparatus of claim 31, wherein the processor uses the third and fourth GPS signals to determine the position of the receiver.

34. The apparatus of claim 29, wherein the receiver receives a fourth GPS signal from a third GPS satellite at a first position of the third GPS satellite.

35. The apparatus of claim 34, wherein the processor uses the fourth GPS signal to determine the position of the receiver.

36. The apparatus of claim 34, wherein the processor uses the third and fourth GPS signals to determine the position of the receiver.

37. An apparatus for determining position using a global position satellite (GPS) signal, comprising:

a receiver for receiving a first GPS signal from a first GPS satellite at a first position of the first GPS satellite and receiving a second GPS signal from the first GPS satellite at a second position of the first GPS satellite; and a position calculation unit for determining a position of the receiver using the first and second GPS signals, wherein when the position calculation unit determines the position of the receiver using the first and second GPS signals from the first GPS satellite, the position calculation unit measures pseudo ranges from the first and second GPS signals and estimates the position of the receiver using differences of a plurality of pairs of immediately consecutive pseudo ranges.

38. The apparatus of claim 37, further comprising a controller for detecting a number of usable satellites that can be used to determine position.

39. The apparatus of claim 37, further comprising a stationary measurement request and selection unit for requesting that the user remain stationary during determination of position.

40. The apparatus of claim 37, wherein the position calculation unit comprises a time difference measurement determiner which requests that the user remain stationary during determination of position if a number of usable satellites is below a threshold.

41. The apparatus of claim 37, wherein the position calculation unit comprises a time difference measurement calculator which calculates the position by measuring time differences between GPS signals.

* * * * *